1,809,435

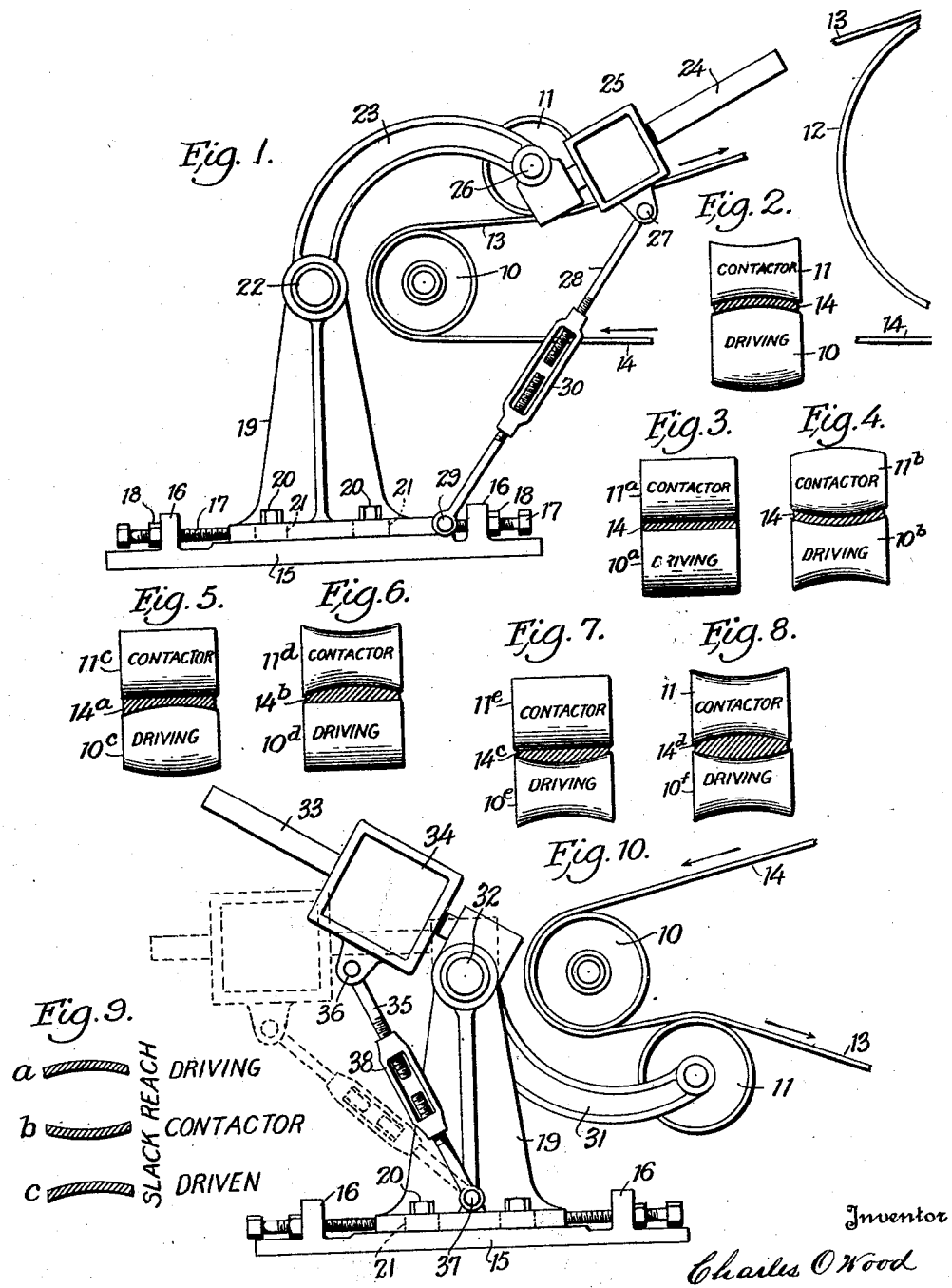
June 9, 1931.     C. O. WOOD     1,809,435
BELT DRIVE
Filed Aug. 18, 1927
Inventor
Charles O Wood
By Henry Orth
Attorney Patented June 9, 1931

UNITED STATES PATENT OFFICE

CHARLES O. WOOD, OF CHAMBERSBURG, PENNSYLVANIA

BELT DRIVE

Application filed August 18, 1927. Serial No. 213,895.

My invention relates to belt drives of the type in which there is employed between the driving and driven pulleys a weighted or loaded contactor pulley for the belt. This well known arrangement of parts permits a greater peripheral contact between the belt and the driven and driving pulleys and decreases the amount of floor space required, as well as the length of the belt.

The object of my invention is to still further decrease the floor space required, by shortening the now accepted permissible distance between the driving and driven pulleys, and also relates to the construction of the faces of these pulleys and the contactor pulley relatively to one another to prevent a change of cross-sectional shape of the belt and to provide means to automatically vary the pressure of the contactor on the belt in accordance with the load on the driven pulley, thereby materially prolonging the life of the belt.

Referring to the drawings in which like parts are similarly designated—

Figure 1 is a side view of a belt drive embodying my invention.

Figs. 2, 3 and 4 are diagrams illustrating various co-operative relative faces for contactor pulley and driving or driven pulley for customary flat belts.

Figs. 5–8 are similar diagrams for special belts.

Fig. 9 is an explanative diagram of the action on the belt of the slack reach as obtains with present drives.

Fig. 10 shows another form of contactor for use when the slack reach of the belt is at the bottom.

As used at present with the customary belts of substantially uniform thickness, all pulley faces are crowned, and the slack reach of the belt, to which the contactor pulley is applied, must, as shown in Fig. 9, first conform to the convex or crowned face $a$ of the driving pulley, then reverse its curvature and conform to the convex or crowned face $b$ of the contactor pulley on the opposite face of the slack reach of the belt, and finally reverse its curvature again to conform to the convex or crowned face $c$ of the driven pulley. This transverse and reverse bending is exceptionally rapid between the driving and contactor pulley, as it is customary to place the contactor pulley close to the driving pulley, and the belt reach between them is short.

This continual bending transversely of the belt from convex to concave and vice versa in such short fractions of a second greatly weakens the belt fibres, especially along the longitudinal central line of the belt, increases materially the ineffective or waste power to drive the belt and tends to weaken or split the belt along its longitudinal center. At the same time there is a tendency to produce transverse surface cracks that become deeper with long usage.

It is the purpose of my invention to obviate these difficulties by improving such a belt drive, thereby attaining considerable economic and technical advantages.

This I do by making the face of the contactor pulley of such a shape as to maintain the cross-sectional shape of the belt as it leaves the driving pulley.

If the driving pulley has the usual crown or convex face as indicated at 10 Fig. 2, then the contactor pulley 11 which engages the opposite face of the belt shall have a concave face, that is to say shall have equal and opposite or complementary curvature as nearly as may be, so that the belt 14 shall not be reversely flexed transversely.

If the driving pulley $10^a$, Fig. 3, has a straight face, then the contactor $11^a$ will also have a straight face.

If the driving pulley $10^b$ Fig. 4 has a concave face, then the contactor pulley $11^b$ will have an opposite and substantially equal curvature, i. e. convex.

With belts having special cross section a similar relative configuration of driving and contactor pulleys obtains to prevent transverse bending of the belt, some of which I have illustrated in Figures 5–7.

In Fig. 5 the belt $14^a$ has a concave driving face and a flat non-driving face; the driving pulley $10^c$ has a convex face, i. e. usual crowned face, and the contactor pulley $11^c$ has a flat face.

In Fig. 6 the belt 14$^b$ has a flat driving face and a convex non-driving face, so that the driving pulley 10$^d$ will have a straight face and the contactor pulley 11$^d$ will have a concave face.

In Fig. 7 the cross section of the belt is the opposite of that shown in Fig. 6, with the driving pulley 10$^e$ concave and conforming to the convex driving face of the belt 14$^c$ and the contactor pulley 11$^e$ has a straight face.

In Fig. 8 the cross section of the belt 14$^d$ is lenticular and both the driving pulley 10$^f$ and contactor pulley 11$^f$ have concave faces.

In all cases the contour of the cross-section of the faces of the driving and driven pulleys shall be the same as nearly as may be, and the contactor pulley shall have the shape to maintain the cross-sectional shape of the belt as it leaves the driving pulley.

Inasmuch as the belt has not to be suddenly reversely flexed, the distance between centres of the pulleys can be decreased.

A flat belt when transversely bent when passing over the driving and driven pulleys flattens out again on leaving them, by the natural resiliency of the belt, and if the belt is reversely flexed this flexure increases, especially so if the reverse flexure happens to be tuned or in synchronism to the natural vibration, in which case the injurious effect is amplified. I prevent any such amplification.

It is also well known that belts stretch along their longitudinal centers to a greater extent than at their edges, due in a measure to the weakening and stretching of the fibre along such centers. With my invention the tendency will be to produce a more uniform stretching and the edges of the belt than lie more closely to the faces of the pulleys, giving an increased efficiency.

The greater the load, the greater the stretch of the belt and greater the amount of take-up required on the slack reach of the belt by the contactor pulley.

As usually constructed, the pressure exerted by the contactor pulley on the slack reach of the belt to prevent slipping and whipping of the belt is constant. This pressure should vary with the load, and thereby relieve the duty of the driving pulley and motor as the load decreases, and by the mechanism in accordance with my invention I do this.

Referring to Figure 1, the slack reach of the belt is above the tight reach 14 of the belt, the driven pulley is indicated at 12, the driving pulley at 10 and the contactor pulley at 11. The faces of these pulleys shall be as above described with reference to the particular cross section of the belt used.

In the construction illustrated, 15 is a pillow block having upstanding lugs or flanges 16 carrying adjusting bolts 17 and lock nuts 18. The pedestal 19 is secured to the pillow block 15 by bolts 20 passing through slots 21.

Mounted on a shaft 22 in the pedestal 19 is a pair of arms 23, having one on each side of the belt, each arm carrying an extension 24 on which slides a weight 25. The contactor pulley 11 is mounted on a shaft 26. Pivoted at one end to each weight at 27 is one end of a link 28 and the other end thereof is pivoted preferably to the pedestal at 29. A turnbuckle 30 in each link 28 permits adjustment of the length of the links.

As the load on the driven pulley 12 increases the belt stretches, the slack reach increases in length and the contactor pulley 11 drops to take up the slack. As the contactor pulley 11 drops the links 28 which are inclined decrease their angle to the horizontal and push the weights 25 along the extensions 24 of the levers 23, thereby increasing the load on the contactor pulley 11 to hold the belt in greater contacting area with all three pulleys, thereby obtaining greater traction.

Bolts 17 are for adjusting the pedestal 19 so as to vary the distance of the contactor pulley from the driving pulley 10.

It will be noted that if a flat belt is used with the ordinary crown or straight face contactor pulley, the belt under load will bend transversely as it changes its shape from the convex face of the delivery pulley to the straight face of the contactor pulley. Consequently there is apt to be a vibration, due to transverse bend of the belt which rapidly and continuously varies, such variation being the greater, the greater the width of the belt, so that there is apt to be a continual movement of the contactor. The counterweight is thus caused to continually move, or has what is called a "shimmy", thus varying the load in accordance with the rapidity of transverse bending, and gives a false change of load on the belt by the weight.

To avoid this, the contactor is made to conform to the transverse shape of the belt.

In Figure 10 I have shown the slack reach 13 of the belt below the tight reach 14, the contactor pulley engaging underneath the belt instead of on top, as in Fig. 1.

In this instance a single lever arm 31 is pivoted on a stub shaft 32 and its extension 33 carries a sliding weight 34. Link 35 pivoted to the weight at 36 and to the pedestal at 37 is provided with a turnbuckle 38 or other length adjusting device.

The two types of contactors using either one or two arms to carry the contactor pulley and to engage the belt from the top or the bottom are not novel and do not constitute part of the present invention.

The invention is not limited to the details shown and described, which may be varied at will within the scope of the appended claims.

Claims.

1. In a belt drive, the combination with a driving pulley, a driven pulley and a belt connecting them; of a contactor pulley engaging the slack reach of the belt, means to load the contactor pulley and means to automatically change the load on said pulley in accordance with the load on the driving pulley.

2. In a belt drive, the combination with a driving pulley, a driven pulley and a belt connecting them; of a contactor pulley engaging the slack reach of the belt, means for loading the contactor pulley, manual means to adjust the load on said contactor pulley, and means to automatically adjust the load on the contactor pulley in accordance with the stretching of the belt.

3. In a belt drive, the combination with a driving pulley, a driven pulley and a belt connecting them; of a contactor pulley engaging the non-driving face of the slack reach of the belt, the cross-sectional contour of whose face is constructed to maintain the cross-sectional contour of the face of the belt with which it contacts as the belt leaves the driving pulley, means to load the contactor pulley and means to automatically vary the load on said contactor pulley in accordance with the stretch of the belt.

4. In a belt drive, the combination with driving and driven pulleys and a belt connecting them; of a contactor pulley engaging the slack reach of the belt, a pivoted arm on which said pulley is mounted, a loading weight slidable on the arm and a link connected at one end to a stationary point and at the other end to said weight, whereby said weight is automatically moved on the arm in accordance to the amount of slack in that reach of the belt with which the contactor pulley engages.

5. In a belt drive, the combination with driving and driven pulleys and a belt connecting them; of a contactor pulley engaging the slack reach of the belt, a pivoted arm on which said pulley is mounted, a loading weight slidable on the arm and a link adjustable as to length connected at one end to a stationary point and at the other end to said weight, whereby said weight is automatically moved on the arm in accordance with the amount of slack in that reach of the belt with which the contactor pulley engages.

6. In a belt drive, the combination with driven and driving pulleys and a belt connecting them; of a pedestal, an arm pivoted in said pedestal, a contactor pulley mounted on said arm, a loading weight movable on said arm, a link pivotally connected at one end to said pedestal and pivotally connected at the other end to said weight, a turnbuckle in said link and means to adjust the pedestal to and from the driving pulley.

7. In a belt drive, the combination with driven and driving pulleys both having crowned faces and a belt connecting them; of a pedestal, a pair of spaced similar arms pivotally mounted in said pedestal, a contactor pulley mounted between the arms for engaging the slack reach of the belt, the cross-sectional contour of the face of which pulley is complementary to the cross-sectional contour of the face of the driving pulley, a weight slidable on each arm for loading the pulley, a link for each arm pivotally connected at one end to said pedestal and at the other end to the weights on the arms to automatically shift the weights on the arms in accordance with the slack in that reach of the belt with which the contactor pulley engages, means to adjust the lengths of the links and means to adjust the pedestal to and from the driving pulley.

In testimony that I claim the foregoing as my invention, I have signed my name hereto.

CHARLES O. WOOD.